United States Patent
Kiser et al.

(10) Patent No.: US 11,303,932 B2
(45) Date of Patent: Apr. 12, 2022

(54) IMAGE COMPRESSION

(71) Applicant: Contrast, Inc., Albuquerque, NM (US)

(72) Inventors: Willie C. Kiser, Albuquerque, NM (US); Michael D. Tocci, Albuquerque, NM (US); Nora Tocci, Albuquerque, NM (US)

(73) Assignee: Contrast, Inc., Albuquerque, NM (US)

( * ) Notice: Subject to any disclaimer, the term of this patent is extended or adjusted under 35 U.S.C. 154(b) by 0 days.

(21) Appl. No.: 16/539,601

(22) Filed: Aug. 13, 2019

(65) Prior Publication Data

US 2020/0059670 A1 Feb. 20, 2020

Related U.S. Application Data

(60) Provisional application No. 62/718,610, filed on Aug. 14, 2018.

(51) Int. Cl.
| | |
|---|---|
| *H04N 19/62* | (2014.01) |
| *H04N 19/11* | (2014.01) |
| *H04N 1/60* | (2006.01) |
| *H04N 19/625* | (2014.01) |
| *H04N 19/176* | (2014.01) |
| *H04N 9/77* | (2006.01) |
| *H04N 19/117* | (2014.01) |

(52) U.S. Cl.
CPC ......... *H04N 19/625* (2014.11); *H04N 1/6008* (2013.01); *H04N 9/77* (2013.01); *H04N 19/117* (2014.11); *H04N 19/176* (2014.11); *H04N 19/62* (2014.11)

(58) Field of Classification Search
CPC ... H04N 19/625; H04N 1/6008; H04N 19/117
USPC ........................................................ 375/240.2
See application file for complete search history.

(56) References Cited

U.S. PATENT DOCUMENTS

| | | | |
|---|---|---|---|
| 5,881,180 A | 3/1999 | Chang et al. | |
| 6,937,770 B1* | 8/2005 | Oguz ................... | H04N 19/176 |
| | | | 375/240.2 |
| 2003/0081674 A1* | 5/2003 | Malvar ............... | H04N 19/126 |
| | | | 375/240.03 |
| 2003/0138154 A1 | 7/2003 | Suino | |
| 2004/0202376 A1 | 10/2004 | Schwartz et al. | |
| 2007/0133889 A1 | 6/2007 | Horie et al. | |
| 2008/0037883 A1 | 2/2008 | Tsutsumi et al. | |

(Continued)

FOREIGN PATENT DOCUMENTS

KR 1020120006300 * 7/2013 ......... H04N 21/8358

OTHER PUBLICATIONS

International Search Report and Written Opinion dated Dec. 10, 2019, for PCT/US19/046350, filed Aug. 13, 2019 (10 pages).

(Continued)

*Primary Examiner* — Jeffery A Williams
(74) *Attorney, Agent, or Firm* — Brown Rudnick LLP; Thomas C. Meyers

(57) ABSTRACT

The invention provides methods that improve image compression and/or quality within the JPEG process by using a low-pass filter to remove high frequency components from image data, which removes blocking artifacts. Preferred embodiments apply the low-pass filter to the Chroma components after decompression prior to conversion into RGB color space.

14 Claims, 8 Drawing Sheets

(56) References Cited

U.S. PATENT DOCUMENTS

| | | | | |
|---|---|---|---|---|
| 2008/0239155 | A1* | 10/2008 | Wong | G06T 5/002 348/624 |
| 2008/0304562 | A1 | 12/2008 | Chang et al. | |
| 2009/0161019 | A1* | 6/2009 | Jang | G06T 5/002 348/663 |
| 2010/0098333 | A1 | 4/2010 | Aoyagi | |
| 2010/0172409 | A1* | 7/2010 | Reznik | H04N 19/61 375/240.2 |
| 2010/0266008 | A1 | 10/2010 | Reznik | |
| 2012/0154370 | A1* | 6/2012 | Russell | G09G 3/346 345/214 |
| 2012/0307893 | A1* | 12/2012 | Reznik | G10L 19/0212 375/240.12 |
| 2013/0064448 | A1 | 3/2013 | Tomaselli et al. | |
| 2013/0148139 | A1* | 6/2013 | Matsuhira | G06K 15/02 358/1.9 |
| 2015/0215595 | A1 | 7/2015 | Yoshida | |
| 2017/0238029 | A1 | 8/2017 | Kiser et al. | |

OTHER PUBLICATIONS

International Search Report and Written Opinion dated Dec. 6, 2019, for PCT/US19/46348, filed Aug. 13, 2019 (9 pages).
Jack, 2005, Color spaces, Chapter 3 in Video Demystified: A Handbook for the Digital Engineer, 4Ed, Newnes (20 pages).
Kresch, 1999, Fast DCT domain filtering using the DCT and the DST, IEEE Trans Imag Proc (29 pages).
Nosratinia, 2002, Enhancement of JPEG-compressed images by re-application of JPEG, Journal of VLSI signal processing systems for signal, image and video technology.
Roberts, 2017, Lossy Data Compression: JPEG, Stanford faculty page (5 pages) Retrieved from the Internet on Feb. 3, 2017, from <https://cs.stanford.edu/people/eroberts/courses/soco/projects/data-compression/lossy/jpeg/dct.htm>.
Sedigh, 1998, Evaluation of filtering mechanisms for MPEG video communications, IEES Symp Rel Dist Sys (6 pages).
Unattributed, 2018, JPEG YCbCr Support, Microsoft (14 page) Retrieved from the Internet on Nov. 20, 2019 from <https://docs.microsoft.com/en-us/windows/win32/wic/jpeg-ycbcr-support>.

* cited by examiner $$T = \begin{bmatrix} .3536 & .3536 & .3536 & .3536 & .3536 & .3536 & .3536 & .3536 \\ .4904 & .4157 & .2778 & .0975 & -.0975 & -.2778 & -.4157 & -.4904 \\ .4619 & .1913 & -.1913 & -.4619 & -.4619 & -.1913 & .1913 & .4619 \\ .4157 & -.0975 & -.4904 & -.2778 & .2778 & .4904 & .0975 & -.4157 \\ .3536 & -.3536 & -.3536 & .3536 & .3536 & -.3536 & -.3536 & .3536 \\ .2778 & -.4904 & .0975 & .4157 & -.4157 & -.0975 & .4904 & -.2778 \\ .1913 & -.4619 & .4619 & -.1913 & -.1913 & .4619 & -.4619 & .1913 \\ .0975 & -.2778 & .4157 & -.4904 & .4904 & -.4157 & .2778 & -.0975 \end{bmatrix}$$

FIG. 3

$$\text{Original} = \begin{bmatrix} 154 & 123 & 123 & 123 & 123 & 123 & 123 & 136 \\ 192 & 180 & 136 & 154 & 154 & 154 & 136 & 110 \\ 254 & 198 & 154 & 154 & 180 & 154 & 123 & 123 \\ 239 & 180 & 136 & 180 & 180 & 166 & 123 & 123 \\ 180 & 154 & 136 & 167 & 166 & 149 & 136 & 136 \\ 128 & 136 & 123 & 136 & 154 & 180 & 198 & 154 \\ 123 & 105 & 110 & 149 & 136 & 136 & 180 & 166 \\ 110 & 136 & 123 & 123 & 123 & 136 & 154 & 136 \end{bmatrix}$$

$$M = \begin{bmatrix} 26 & -5 & -5 & -5 & -5 & -5 & -5 & 8 \\ 64 & 52 & 8 & 26 & 26 & 26 & 8 & -18 \\ 126 & 70 & 26 & 26 & 52 & 26 & -5 & -5 \\ 111 & 52 & 8 & 52 & 52 & 38 & -5 & -5 \\ 52 & 26 & 8 & 39 & 38 & 21 & 8 & 8 \\ 0 & 8 & -5 & 8 & 26 & 52 & 70 & 26 \\ -5 & -23 & -18 & 21 & 8 & 8 & 52 & 38 \\ -18 & 8 & -5 & -5 & -5 & 8 & 26 & 8 \end{bmatrix}$$

$$D = \begin{bmatrix} 162.3 & 40.6 & 20.0 & 72.3 & 30.3 & 12.5 & -19.7 & -11.5 \\ 30.5 & 108.4 & 10.5 & 32.3 & 27.7 & -15.5 & 18.4 & -2.0 \\ -94.1 & -60.1 & 12.3 & -43.4 & -31.3 & 6.1 & -3.3 & 7.1 \\ -38.6 & -83.4 & -5.4 & -22.2 & -13.5 & 15.5 & -1.3 & 3.5 \\ -31.3 & 17.9 & -5.5 & -12.4 & 14.3 & -6.0 & 11.5 & -6.0 \\ -0.9 & -11.8 & 12.8 & 0.2 & 28.1 & 12.6 & 8.4 & 2.9 \\ 4.6 & -2.4 & 12.2 & 6.6 & -18.7 & -12.8 & 7.7 & 12.0 \\ -10.0 & 11.2 & 7.8 & -16.3 & 21.5 & 0.0 & 5.9 & 10.7 \end{bmatrix}$$

FIG. 4

$$Q50 = \begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}$$

$$C = \begin{bmatrix} 10 & 4 & 2 & 5 & 1 & 0 & 0 & 0 \\ 3 & 9 & 1 & 2 & 1 & 0 & 0 & 0 \\ -7 & -5 & 1 & -2 & -1 & 0 & 0 & 0 \\ -3 & -5 & 0 & -1 & 0 & 0 & 0 & 0 \\ -2 & 1 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

$$C = \begin{bmatrix} 10 & 4 & 2 & 5 & 1 & 0 & 0 & 0 \\ 3 & 9 & 1 & 2 & 1 & 0 & 0 & 0 \\ -7 & -5 & 1 & -2 & -1 & 0 & 0 & 0 \\ -3 & -5 & 0 & -1 & 0 & 0 & 0 & 0 \\ -2 & 1 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

$$R = \begin{bmatrix} 160 & 44 & 20 & 80 & 24 & 0 & 0 & 0 \\ 36 & 108 & 14 & 38 & 26 & 0 & 0 & 0 \\ -98 & -65 & 16 & -48 & -40 & 0 & 0 & 0 \\ -42 & -85 & 0 & -29 & 0 & 0 & 0 & 0 \\ -36 & 22 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

FIG 6

IMAGE COMPRESSION

CROSS-REFERENCE TO RELATED APPLICATION(S)

This application claims benefit of U.S. Provisional Application Ser. No. 62/718,610, filed Aug. 14, 2018, all incorporated by reference.

TECHNICAL FIELD

The disclosure relates to image compression.

BACKGROUND

As reliance on computers and the Internet continues to grow, so too does the need for efficient ways of storing and sending large amounts of data. For example, a web page with dozens, if not hundreds, of images needs to use some form of image compression to store images. Likewise, an online catalog packed with images requires image compression to download the images over the Internet quickly.

The Joint Photographic Experts Group (JPEG) has created a popular image compression process that simplifies certain high-frequency components in an image and then compresses the image for storage. Typical JPEG files convert images from the RGB color space to the $YC_bC_r$ space. The Y channel, often referred to as the Luma, is preserved; whereas the $C_bC_r$ channel, often referred to as the Chroma, is down-sampled, or reduced, and then both channels are split into 8×8 blocks. That is, the first "lossy" step of the algorithm and, depending on the size of the image, can result in artifacts being introduced into the image. Next, the discrete cosine transform (DCT) is used to convert the 8×8 Luma and Chroma blocks into DCT coefficients in order to minimize, or eliminate, the higher frequencies, which are not perceived by the human eye as readily as the lower frequencies. The DCT coefficients for Luma and Chroma are then quantized, which, among other things, eliminates the higher coefficients representing the higher frequencies. Next, the quantized coefficients are compressed using Run Length Encoding to group all like coefficients such as "zeros" left over from quantizing. Finally, the Run Length Encoded values are further compressed using Huffman coding which uses shorter code words for more often used run-length encoding (RLE) values and longer code words for less often used RLE values. Because JPEG is a lossy compression algorithm, decompression will present artifacts in the image, such as so called blocking artifacts.

SUMMARY

The invention provides methods for removing image artifacts in JPEG compressed images. The result is an improved JPEG process that produces high-quality decompressed images. In particular aspect, methods of the invention apply a low-pass filter to de-quantized upsampled Chroma data to reduce output image blocking artifacts. The invention also contemplates applying a low-pass filter in other ways as discussed below. In any case, the invention provides the benefits of compression while maintaining image quality at a high level in the decompressed image.

In certain preferred aspects, the invention provides methods for compressing image data. Methods include executing a JPEG transform, storing and/or transmitting the compressed image, decompressing the image data, applying a low-pass filter to the Chroma channel of the decompressed data and converting the Chroma and Luma portions back to the RGB color space for display. An example of this process is shown in FIG. 1. In brief, as shown in FIG. 1, RGB image data are converted to the YCbCr space, the Chroma channel is downsampled and a discrete cosine transform (DCT) is performed on the Chroma, both channels are quantized, and compression steps, such Huffman coding, bitpacking and the like, are used to produce compressed image data for storage or transmission. A reverse transform is conducted to reconstitute the image in which the Chroma channel is subsequently passed through a low-pass filter and then both channels are transformed back into the RGB space for viewing. While FIG. 1 illustrates a preferred method, the invention contemplates broad use of low pass filters to reduce artifacts resulting from JPEG compression.

In certain embodiments, the various compression steps (e.g., DCT, quantization, entropy encoding (e.g., Huffman encoding, bitpacking, etc.) are performed by a computer system comprising a processor coupled to a non-transitory memory device. Methods may optionally include writing the compressed image data to disc as an image file, such as a JPEG file, or transmitting the compressed image.

In certain aspects, the invention provides methods for compressing image data. Embodiments of the methods include obtaining a JPEG compressed image corresponding to an original image and decompressing the JPEG compressed image to produce an output image via a decompression operation that includes a low pass filter. Preferably, decompressing the JPEG image comprises decoding the image to produce a YCbCr image having Luma and Chroma components. The low pass filter may be applied to the Chroma components of the YCbCr image to produce a filtered YCbCr image. The method may include transforming the filtered YCbCr image into the RGB color space to produce the output image.

In certain embodiments, obtaining the JPEG compressed image includes receiving the original image and performing a discrete cosine transform (DCT) (e.g., such as a type-II DCT) and quantization step on image data from the original image, and may include transforming the original image from the RGB color space into the YCbCr color space and blocking the image into blocks of pixels. In some embodiments, quantizing the DCT coefficients includes scaling the DCT coefficients and rounding the scaled DCT coefficients to the nearest integers. The quantized DCT coefficients may be compressed via entropy encoding (e.g., Huffman coding or run length encoding) to create the JPEG compressed image. Preferably, the steps are performed using a device such as a computer or a camera that includes a processor coupled to a non-transitory, tangible memory. The JPEG compressed image may be written to the tangible memory. Preferably, the low pass filter removes one or more blocking artifacts from the output image.

Aspects of the invention provide a hardware system in which at least one device includes a processor coupled to a non-transitory memory device. The memory device stores instructions executable by the processor to cause the system to obtain a JPEG compressed image corresponding to an original image and decompress the JPEG compressed image to produce an output image via a decompression operation that includes a low pass filter.

Methods disclosed herein can be carried out by any suitable device, such as a digital camera, a computer, a tablet computer, a wearable computer, a mobile phone, or a smartphone. In such examples, the method is written as a set of instructions that when executed by a device processor, causes the device to perform the method. These instructions can be stored in a non-transitory computer readable medium, such RAM or disk memory.

Methods of the invention may be implemented within a camera so that the camera can capture, store, or transmit pictures or videos with improved quality or compression. Thus in some embodiments, methods of the invention include receiving, from an image sensor, image data onto a processing device on a camera. The processing device may be a chip such as a field-programmable gate array or application-specific integrated circuit. The processing device transforms the image data into the frequency domain and quantizes and low-pass filters the resultant frequency components.

In some aspects, the disclosure provides a method for compressing image data. The method includes: performing a discrete cosine transform (DCT) on image data to return DCT coefficients; quantizing and applying a low-pass filter (LPF) to the DCT coefficients to return quantized, filtered DCT coefficients; and compressing the quantized, filtered DCT coefficients to produce the compressed image data. Prior art compressed formats such as JPEG do not have an LP applied to DCT coefficients independently of a quantization step. The low-pass filter may be applied prior to the quantizing or the quantizing may be performed prior to the low-pass filter. Preferably the low-pass filter discards non-zero values for one or more of the DCT coefficients that represent a high-frequency component of the image data. The low pass filter may be used to remove one or more blocking artifacts from the output image. The steps may be performed by a computer system comprising a processor coupled to a non-transitory memory device. In some embodiments, compressing the quantized, filtered DCT coefficients comprises Huffman coding and writing the compressed image data to the non-transitory memory device as a JPEG file. The method may include transforming the original image from the RGB color space into the YCbCr color space.

In certain embodiments, quantizing the DCT coefficients includes scaling the DCT coefficients and rounding the scaled DCT coefficients to the nearest integers. Compressing the quantized, filtered DCT coefficients to produce the compressed image data may be done by entropy encoding to create a JPEG compressed image. The entropy coding may include Huffman coding or run length encoding. The steps may be performed by a computer system comprising a processor coupled to a non-transitory memory device and the method may include writing the JPEG compressed image to the memory device.

BRIEF DESCRIPTION OF THE DRAWINGS

FIG. 3 shows the matrix for a DCT.
FIG. 4 shows obtaining a matrix of DCT coefficients.
FIG. 5 shows a quantization matrix.
FIG. 6 illustrates decompression of the image.

DETAILED DESCRIPTION

The invention provides methods that improve the JPEG process by using a low-pass filter to remove high frequency components from image data, preferably by applying a low-pass filter to the Chroma components after decompressing a JPEG file. Generally, in methods of the invention, an RGB file is converted into YCbCr color space. The Y, Cr, and Cb channels are blocked by minimum code unit (MCU). The MCUs are subject to a discrete cosine transform (DCT) and quantization. The resultant matrices are encoded in a compressed manner by, e.g., Huffman encoding. The compressed data may be written to a file and/or transmitted, e.g., over the Internet. The compression may be performed by a general purpose computer or may be implemented in a device such as a camera that uses an image sensor to capture images and may further include a processing device to operate as an image compressor.

Figure 1:
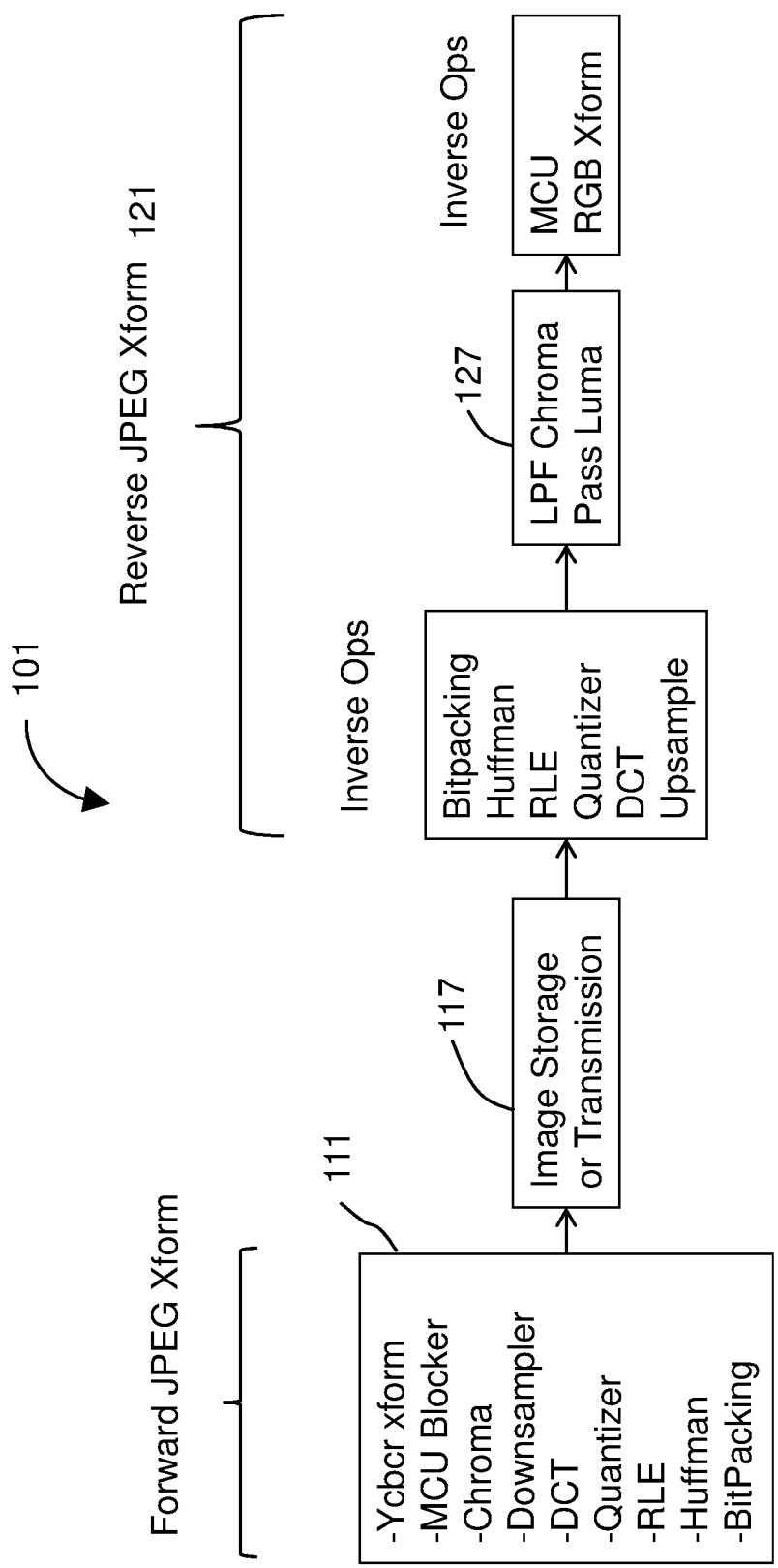
FIG. 1 diagrams a method for JPEG compression.

FIG. 1 diagrams a method 101 for JPEG compression/decompression according to embodiments of the invention. The left portion shows compression via the forward JPEG transform block 111, and the diagram continues to the right to show the reverse JPEG transform 121, i.e., the decompression. JPEG was designed by the Joint Photographic Experts Group to compress realistic true-color or grayscale images, such as photographs or fine artwork. JPEG supports 256 color grades (8 bit) per color channel. This equals 24 bits per pixel in color mode (16 million colors) and 8 bits per pixel in grayscale. Grayscale images are thus smaller than their full-color counterparts. JPEG can compress the average color image about 20 times without visual quality loss.

JPEGs compress images based on their spatial frequency, or level of detail in the image. In the forward JPEG transform block 111, the JPEG algorithm transforms the image from an RGB color space into the luminance/chrominance (YCbCr) color space. In preferred embodiments, the algorithm leaves luminance alone and "downsamples" the Chroma components 2:1 horizontally (either by discarding every second horizontal sample or averaging the two hue values into one) and 2:1 or 1:1 vertically, saving about one-half to one-third off the image data. This is often abbreviated as 4:2:2 or 4:1:1 sampling.

Additionally, the pixel values for each component are grouped into 8×8 blocks, or MCUs. These blocks then are transformed from the spatial domain to the frequency domain with a Discrete Cosine Transform (DCT), performed separately for the Luma and both Chroma components. The DCT converts the image into a two-dimensional array of frequency coefficients, which are then quantized. In quantization, each block of 64 frequency components is divided by a separate quantization coefficient and rounded to integer values. For encoding (e.g., run-length encoding, Huffman encoding, Bitpacking) each block is scanned in a zig-zag pattern starting from the top-left corner. This outputs a linear stream of bits which allows for lossless compression of non-zero coefficients with arithmetic or Huffman coding. The product of this portion of the pipeline is highly compressed and suitable for storage or transmission 117.

The remaining steps of the method 101 show the decompression of JPEG, i.e., the reverse JPEG transform 121. The reverse transform 121 includes undoing the encoding (e.g., reversing the Huffman/RLE) and then multiplying by the quantization matrix to re-constitute the DCT coefficients. Those are transformed back into the spatial domain by the inverse DCT (IDCT) equation. The blocks are up-sampled and subject to filtering 127 before reversing the MCU blocker and transforming from YCbCr into RGB color space.

In some preferred embodiments, the invention includes the filtering 127 within the method 101 of JPEG compression/decompression. In the filtering 127 step, the Luma components may be passed through the pipeline without applying any filters, while the Chroma components are subject to a low-pass filter (LPF).

The LPF improves the image quality by removing blocking artifacts that have been introduced via other steps of the method 101. Blocking artifacts are visible elements not appearing the original image but that are present after the JPEG method 101. Blocking artifacts are present predominantly in the higher frequencies, and thus are removed by the LPF. Thus the LPF 127 is applied to the Chroma components, the high-frequency blocking artifacts are removed, and the final output JPEG has an improved appearance—lacking blocking artifacts—relative to a JPEG produced by a method that is similar but lacking an LPF.

Figure 2:
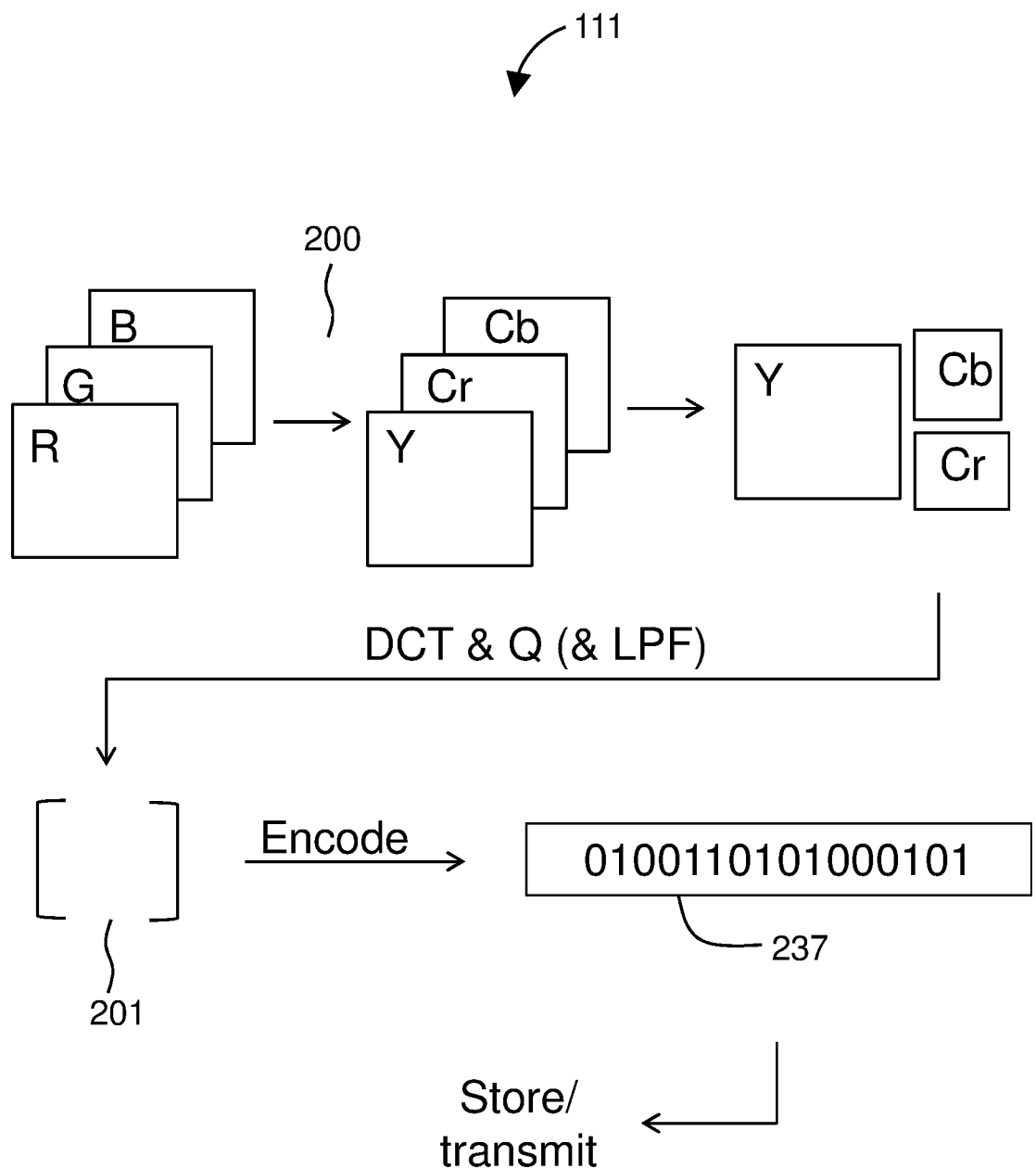
FIG. 2 is a detailed diagram of JPEG encoding.

FIG. 2 shows the JPEG encoding 111 in greater detail. The RGB input is transformed into the YCbCr color space. In preferred embodiments, the algorithm leaves luminance alone and downsamples the Chroma components. The image is broken into blocks of, for example, 8×8 pixels and each block is transformed using the DCT. The resulting 64 DCT coefficients are quantized (Q) to a finite set of values. The degree of rounding depends upon the specific coefficients. The DC coefficient (at location 0,0) is a measure of the average value of the 64 pixels within the specific image block and the remaining 63 quantized coefficients are scanned in zig zag sequence. In some aspects, the disclosure provides a method 111 for compressing image data. The method includes: performing a discrete cosine transform (DCT) on image data to return DCT coefficients; quantizing (Q) and applying a low-pass filter (LPF) to the DCT coefficients to return quantized, filtered DCT coefficients 201; and compressing the quantized, filtered DCT coefficients 201 to produce the compressed image data (e.g., stream of bits 237). The return quantized, filtered DCT coefficients 201 provide an unexpected benefit in that the LPF removes blocking artifacts from a final compressed image that is stored or transmitted by the method 111. The low-pass filter (LPF) may be applied prior to the quantizing or the quantizing may be performed prior to the low-pass filter.

Preferably the low-pass filter discards non-zero values for one or more of the DCT coefficients that represent a high-frequency component of the image data. The steps may be performed by a computer system comprising a processor coupled to a non-transitory memory device. In some embodiments, compressing the quantized, filtered DCT coefficients 201 comprises Huffman coding and writing the compressed image data (e.g., the stream of bits 237) to the non-transitory memory device as a JPEG file. The method may include transforming 200 the original image from the RGB color space into the YCbCr color space.

The DCT may use a DCT equation given by Equation 1 below. The DCT equation computes the i,jth entry of the DCT of the image data 15. Thus p(x, y) is the x,yth element of the image represented by the matrix p. The DCT equation calculates one entry (i,jth) of a transformed image from pixel values of an original image matrix.

$$D(i, j) = \frac{1}{\sqrt{2N}} C(i)C(j) \sum_{x=0}^{N-1} \sum_{y=0}^{N-1} p(x, y) \cos\left[\frac{(2x + 1)i\pi}{2N}\right] \cos\left[\frac{(2y + 1)j\pi}{2N}\right] \quad 1$$

$$C(u) = \begin{cases} \frac{1}{\sqrt{2}} & \text{if } u = 0 \\ 1 & \text{if } u > 0 \end{cases} \quad 2$$

By way of non-limiting example, the image data can include an image block of 8×8 pixels so that N equals 8, and x and y range from 0 to 7. (Other image block sizes are contemplated such as 4×4 pixels and 16×16 pixels) The DCT equation for an 8×8 image block is given Equation 3 below.

$$D(i, j) = \frac{1}{4} C(i)C(j) \sum_{x=0}^{7} \sum_{y=0}^{7} p(x, y) \cos\left[\frac{(2x + 1)i\pi}{16}\right] \cos\left[\frac{(2y + 1)j\pi}{16}\right] \quad 3$$

To put Equation 1 into matrix form, use Equation 4.

$$T_{i,j} = \begin{cases} \frac{1}{\sqrt{N}} & \text{if } i = 0 \\ \sqrt{\frac{2}{N}} \cos\left[\frac{(2j + 1)i\pi}{2N}\right] & \text{if } i > 0 \end{cases} \quad 4$$

FIG. 3 shows the matrix T provided by Equation 4. The top row (i=1) of T has all entries equal to 1/(SQRT(8)).

FIG. 4 shows obtaining a matrix of 64 DCT coefficients from an input 8×8 block of pixels. At the top is depicted a block of image-pixel values ("Original"). The block is made to have the values (which range from 0 to 256) be "centered" on zero by subtracting 128 from each entry, to create the matrix M shown in the middle. The DCT is performed on the matrix M according to matrix multiplication via D=TMT-1. This yields the matrix D at the bottom.

Matrix D include 64 DCT coefficients in which the top-left entry corresponds to the low frequencies of the original image block. The matrix D will next be quantized through the use of a quantization matrix Q. One may choose a level of compression or quality through the choice of which matrix Q is used. A middle-ground example is shown wherein the matrix is Q50.

FIG. 5 shows Q50, a standard quantization matrix with a quality level of 50.

For quantization, each element in the matrix D is divided by the corresponding element in the quantization matrix Q (here, Q50). This yields the matrix C of quantized coefficients. Thus, here, the method 111, quantizing the DCT coefficients includes scaling the DCT coefficients and rounding the scaled DCT coefficients to the nearest integers.

The quantized matrix C is then encoded. Encoding includes converting the coefficients of C into binary and reading entries from the matrix C in a zig-zag order, starting with entry (0,0), and proceeding through (0,1), (1,0), (1,1), (0,2) . . . . This results in a linear stream 237 of bits which is encoded in a compressed fashion by, e.g., Huffman encoding.

The resulting encoded, compressed stream of bits 237 can then be stored or transmitted 117. Due to the encoding and compression, the file will be smaller and thus take up less disc space than the original file. Here, compressing the quantized, filtered DCT coefficients 201 to produce the compressed image data may be done by entropy encoding to create a JPEG compressed image. The entropy coding may include Huffman coding or run length encoding. After storing or transmitting 117 the file(s), the image can be subject to the reverse JPEG transform 121 of method 101 for decompression and presentation of a high-quality image.

Decompression refers to the process of reconstruction the image from the compressed, encoded bits.

FIG. 6 illustrates steps of the decompression of the image. The bit stream is initially decoded back into the quantized matrix C. Each element of C is multiplied by the corresponding element of the quantization matrix Q that was used, to result in the matrix R.

The matrix R is subject to an inverse DCT (IDCT), and 128 is added to each entry, which produces an decompressed JPEG version of the original corresponding MCU.

Decompression is accomplished by applying the inverse of each of the preceding steps in opposite order. Thus, the decoding process starts with entropy decoding and proceeds to convert the run lengths to a sequence of zeros and coefficients. Coefficients are de-quantized and subject to the Inverse Discrete Cosine Transform (IDCT). The resulting upsampled image in the YCbCr color space may then be filtered according to methods of the invention.

Figure 7:
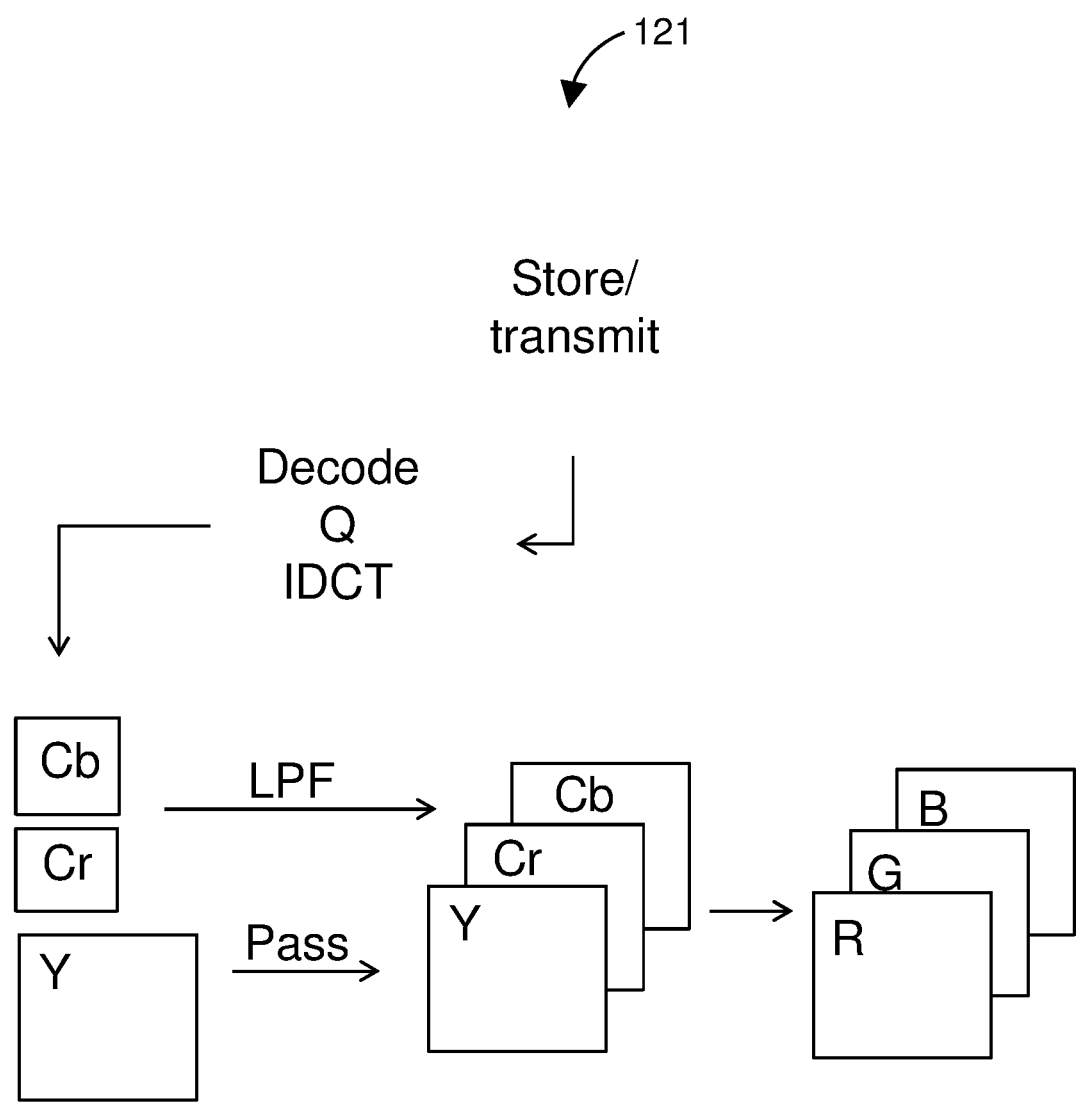
FIG. 7 shows a decompression operation that includes a low pass filter.

FIG. 7 shows steps of the reverse JPEG transform 121 according to the method 101. It can be seen that after the initial inverse operations (e.g., de-quantization and IDCT), the image is in the YCbCr color space. Preferably, the method 101 operates on upsampled MCUs in the YCbCr color space. At this stage, the Chroma components of the image are subject to a low-pass filter. The low pass filter (LPF) removes high-frequency components from the image data.

By including an LPF, blocking artifacts are removed. An LPF is a type of filter that removes signals above a certain frequency or removes high-frequency signal from the image. Implementation of an LPF is understood in the art and is applied herein the reverse JPEG transform 121 to improve image quality by, e.g., removing blocking artifacts.

Blocking artifacts include distortion in compressed images that may appear as a pattern of visible block boundaries. Those artifacts result from the coarse quantization of the coefficients and the independent processing of the blocks. Implementing an LPF may remove the blocking artifacts. The LPF may be implemented as a kernel (e.g., with positive values) that operates on the Chroma components during decompression 121. Thus the invention provides a method 101 for JPEG compression/decompression that includes an LPF to remove blocking artifacts.

Preferably the LPF operates on the Chroma components during decompression 121. Optionally, it may be found that the LPF is useful or beneficial at other step(s) of the forward JPEG compression block 111 or the reverse transform 121. Thus it is within the scope of the invention to include one or more LPF at any step of the diagramed methods.

FIG. 7 thus shows steps of a method that includes obtaining a JPEG compressed image corresponding to an original image and decompressing the JPEG compressed image to produce an output image (e.g., substantially similar to the original image) via a decompression operation that includes a low pass filter. Decompressing the JPEG image may include decoding the image to produce a YCbCr image having Luma and Chroma components. Preferably, the low pass filter is applied to the Chroma components of the YCbCr image to produce a filtered YCbCr image. The method may include transforming the filtered YCbCr image into the RGB color space to produce the output image.

Obtaining the JPEG compressed image may proceed as shown in FIG. 2, e.g., by receiving the original image and performing a discrete cosine transform (DCT) and quantization step on image data from the original image. The method may include transforming the original image from the RGB color space into the YCbCr color space and blocking the image into blocks of pixels.

Methods of the invention may be implemented in hardware or using software as embodied within a device or systems of the invention.

Figure 8:
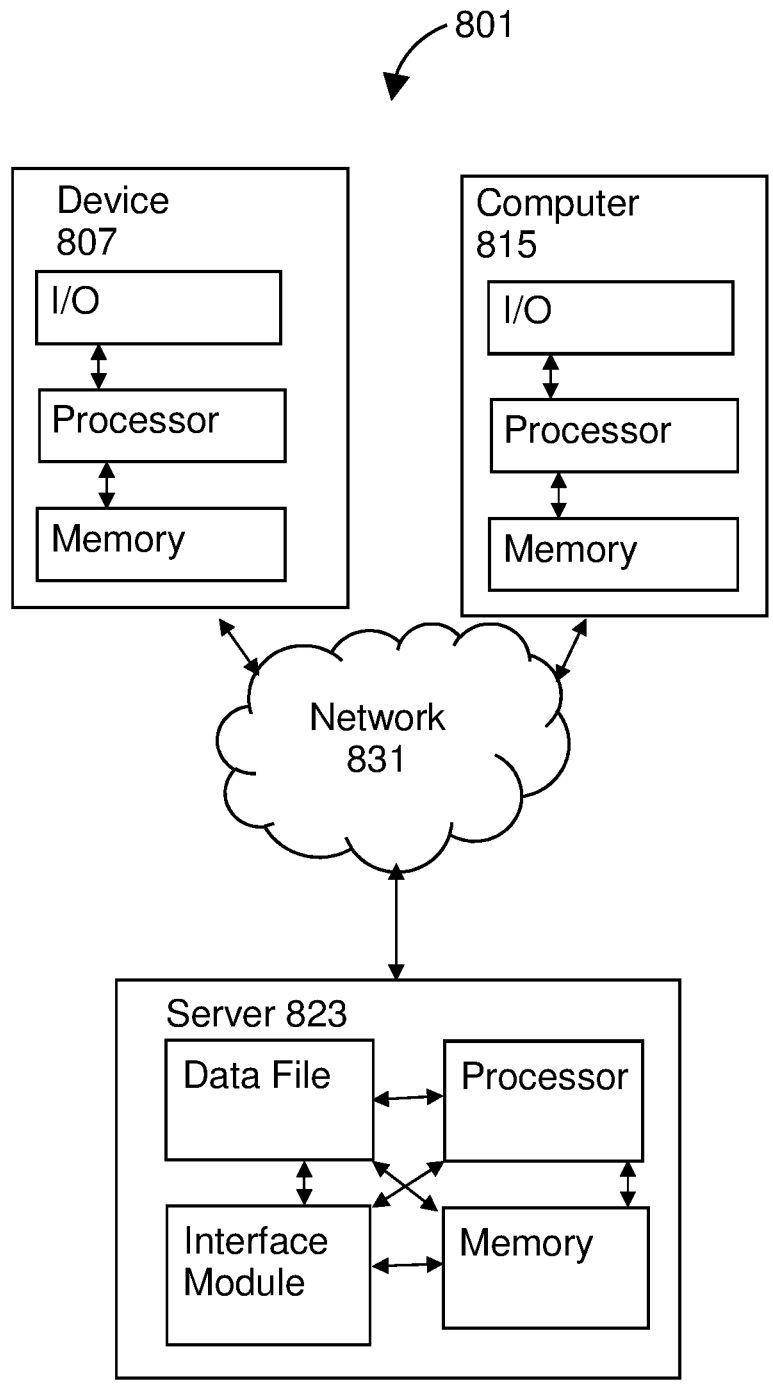
FIG. 8 shows a system for JPEG compression or decompression.

FIG. 8 shows a system 801 useful for image compression by methods of the invention. The system 801 preferably includes at least one computer 815. Optionally, the system 801 includes a device 807 (such as a digital still or movie camera), a server computer 823, or both. Each of the computer 815, device 807, and server 823—when included in the system 801—preferably includes at least one processor coupled to memory and one or more input/output devices. The computer 815, device 807, and server 823, when present, are able to communicate over network 831.

The system 801 thus includes a processor coupled to a non-transitory memory device. The memory preferably stores instructions executable by the processor to cause the system to obtain a JPEG compressed image corresponding to an original image and decompress the JPEG compressed image to produce an output image via a decompression operation that includes a low pass filter.

Processor refers to any device or system of devices that performs processing operations. A processor will generally include a chip, such as a single core or multi-core chip, to provide a central processing unit (CPU). A process may be provided by a chip from Intel or AMD. A processor may be any suitable processor such as the microprocessor sold under the trademark XEON E7 by Intel (Santa Clara, Calif.) or the microprocessor sold under the trademark OPTERON 6200 by AMD (Sunnyvale, Calif.).

Memory refers a device or system of devices that store data or instructions in a machine-readable format. Memory may include one or more sets of instructions (e.g., software) which, when executed by one or more of the processors of the disclosed computers can accomplish some or all of the methods or functions described herein. Preferably, each computer includes a non-transitory memory such as a solid state drive, flash drive, disk drive, hard drive, subscriber identity module (SIM) card, secure digital card (SD card), micro SD card, or solid-state drive (SSD), optical and magnetic media, others, or a combination thereof.

An input/output device is a mechanism or system for transferring data into or out of a computer. Exemplary input/output devices include a video display unit (e.g., a liquid crystal display (LCD) or a cathode ray tube (CRT)), an alphanumeric input device (e.g., a keyboard), a cursor control device (e.g., a mouse), a disk drive unit, a signal generation device (e.g., a speaker), a touchscreen, an accelerometer, a microphone, a cellular radio frequency antenna, and a network interface device, which can be, for example, a network interface card (NIC), Wi-Fi card, or cellular modem.

Various aspects and functions of the method 101 for JPEG compression/decompression can be implemented using components of the system 801. Those components may include, among others, network appliances, personal computers, workstations, mainframes, networked clients, servers, media servers, application servers, database servers, and web servers. Other examples of computer systems may include mobile computing devices, such as cellular phones and personal digital assistants, and network equipment, such as load balancers, routers, and switches. Further, aspects may be located on a single computer system or may be distributed among a plurality of computer systems connected to one or more communications networks.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A method for processing image data, the method comprising:
   receiving an original image;
   transforming the original image into the YCbCr color space to produce a YCbCr image;
   performing a discrete cosine transform (DCT) of the YCbCr image to obtain DCT coefficients;
   applying a low pass filter to Chroma components of the DCT coefficients while allowing a Luma component to pass unfiltered;
   quantizing the filtered DCT coefficients to yield quantized, filtered DCT coefficients; and
   compressing the quantized, filtered DCT coefficients to produce a JPEG compressed image.

2. The method of claim 1, further comprising:
   decoding the JPEG compressed image to produce a YCbCr image; and
   transforming the filtered YCbCr image into the RGB color space to produce an output image.

3. The method of claim 1, wherein the low-pass filter is applied prior to the quantizing.

4. The method of claim 3, further comprising blocking the YCbCr image into blocks of pixels.

5. The method of claim 3, wherein the DCT is a type-II DCT.

6. The method of claim 3, wherein quantizing the DCT coefficients includes scaling the DCT coefficients and rounding the scaled DCT coefficients to the nearest integers.

7. The method of claim 3, wherein compressing the quantized, filtered DCT coefficients uses entropy encoding to create the JPEG compressed image.

8. The method of claim 7, wherein entropy coding includes Huffman coding or run length encoding.

9. The method of claim 7, wherein the steps are performed on a camera comprising a processor coupled to a non-transitory memory device.

10. The method of claim 7, further comprising writing the JPEG compressed image to tangible memory.

11. The method of claim 1, wherein the low pass filter removes one or more blocking artifacts from the output image.

12. A method for compressing image data, wherein the method consists of:
    performing a discrete cosine transform (DCT) on YCbCr image data to return DCT coefficients;
    applying a low pass filter to Chroma components of the DCT coefficients while allowing a Luma component to pass unfiltered;
    quantizing the filtered DCT coefficients to return quantized, filtered DCT coefficients;
    compressing the quantized, filtered DCT coefficients to produce compressed image data; and
    writing the compressed image data to tangible memory.

13. The method of claim 12, wherein the steps are performed on a camera comprising a processor coupled to a non-transitory memory device.

14. The method of claim 13, wherein compressing the quantized, filtered DCT coefficients comprises Huffman coding.

* * * * *